(12) United States Patent
Schaefer et al.

(10) Patent No.: US 9,056,632 B2
(45) Date of Patent: Jun. 16, 2015

(54) MOTOR VEHICLE WITH RADIATOR TANK ASSEMBLY

(71) Applicant: GM GLOBAL TECHNOLOGY OPERATIONS LLC, Detroit, MI (US)

(72) Inventors: Joachim Schaefer, Darmstadt (DE); Uwe Schmitz, Nauheim (DE); Stefan Wolff, Hochheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/785,716

(22) Filed: Mar. 5, 2013

(65) Prior Publication Data

US 2013/0257102 A1 Oct. 3, 2013

(30) Foreign Application Priority Data

Mar. 29, 2012 (DE) .......................... 10 2012 006 533

(51) Int. Cl.
*B62D 25/08* (2006.01)

(52) U.S. Cl.
CPC .................................... *B62D 25/081* (2013.01)

(58) Field of Classification Search
CPC .................................................. B62D 25/081
USPC ............... 296/193.09, 187.09, 187.1, 193.06, 296/95.1, 93, 84.1, 192
See application file for complete search history.

(56) References Cited

U.S. PATENT DOCUMENTS

| | | | | |
|---|---|---|---|---|
| 4,765,019 A | * | 8/1988 | Ochino | ...................... 15/250.19 |
| 7,182,397 B1 | * | 2/2007 | Desai | .............................. 296/192 |
| 2008/0252103 A1 | * | 10/2008 | Bechtold et al. | .............. 296/192 |
| 2012/0175915 A1 | | 7/2012 | Weigl et al. | |

FOREIGN PATENT DOCUMENTS

| | | |
|---|---|---|
| DE | 19939191 A1 | 3/2001 |
| DE | 102007017427 A1 | 11/2008 |
| FR | 2754503 A1 | 4/1998 |
| JP | 2010100166 A * | 5/2010 |

OTHER PUBLICATIONS

German Patent Office, German Search Report for Application No. 102012006533.7, dated Oct. 25, 2012.

* cited by examiner

*Primary Examiner* — Glenn Dayoan
*Assistant Examiner* — Melissa A Black
(74) *Attorney, Agent, or Firm* — Ingrassia Fisher & Lorenz PC

(57) ABSTRACT

A motor vehicle has a windshield and a radiator tank assembly that acts on the lower edge of the windshield and exhibits a guide pad extending on an interior side of the windshield. The guide pad is divided into a central and two lateral sections. The lateral sections are more flexible than the central section during exposure to a pressure acting on the windshield from outside.

18 Claims, 3 Drawing Sheets

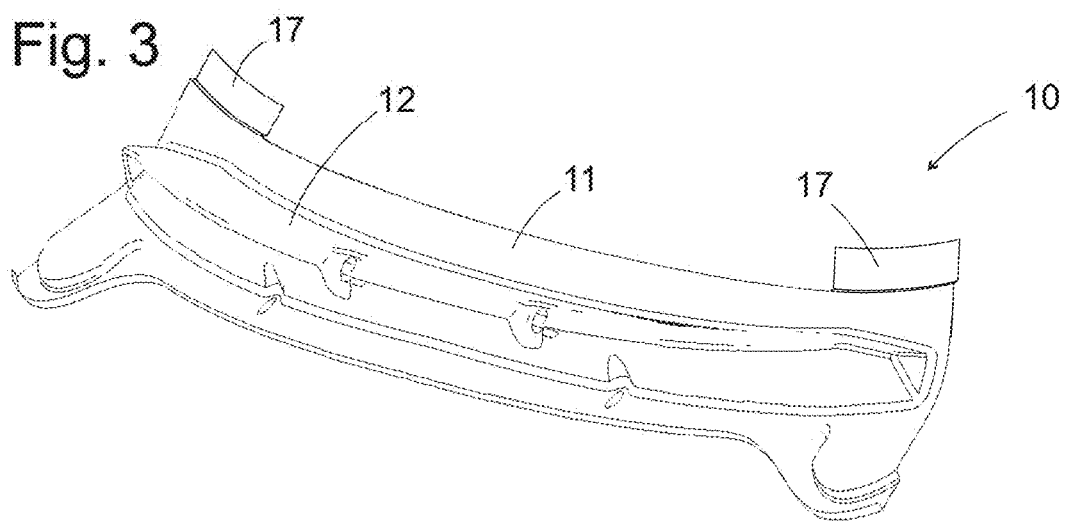
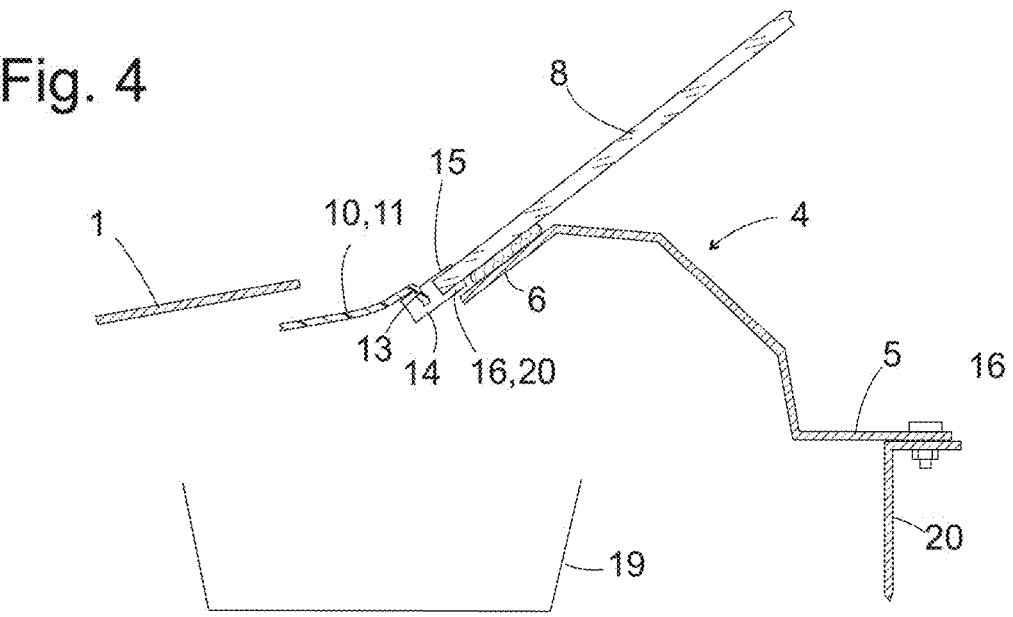
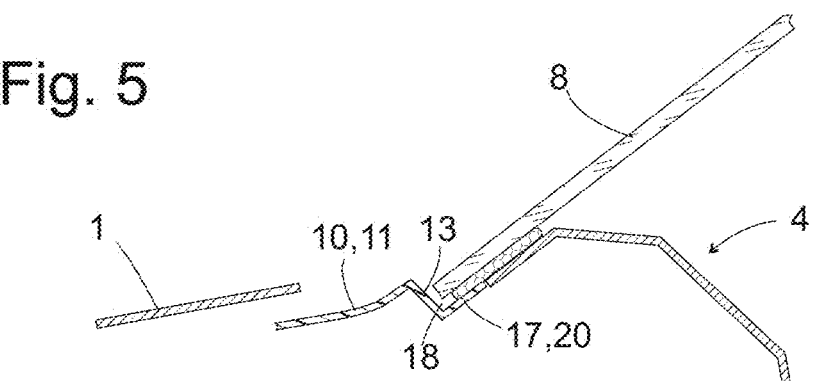

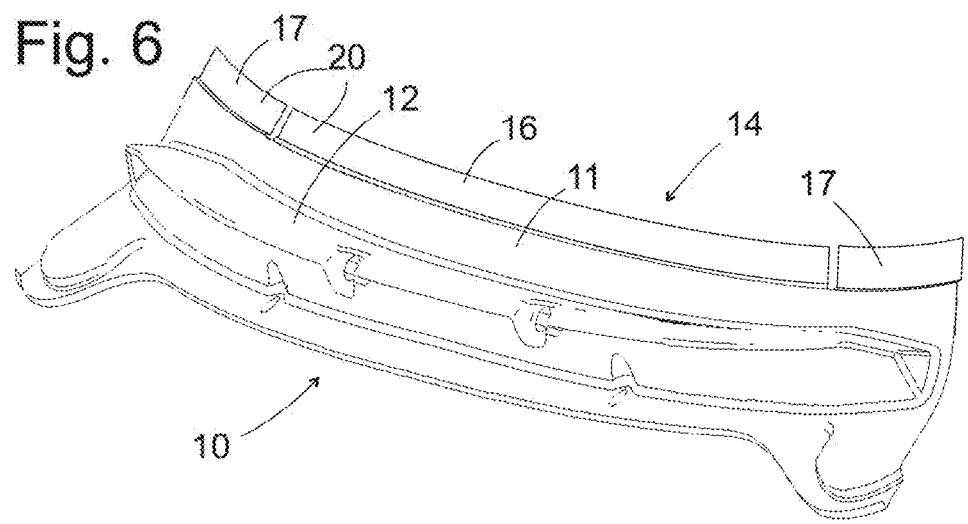
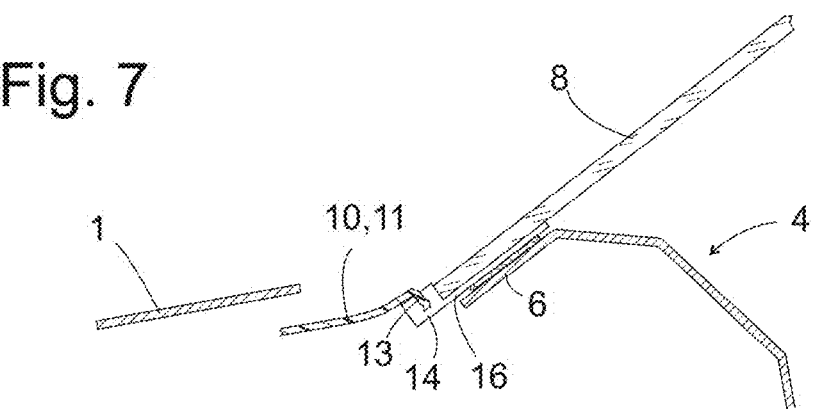
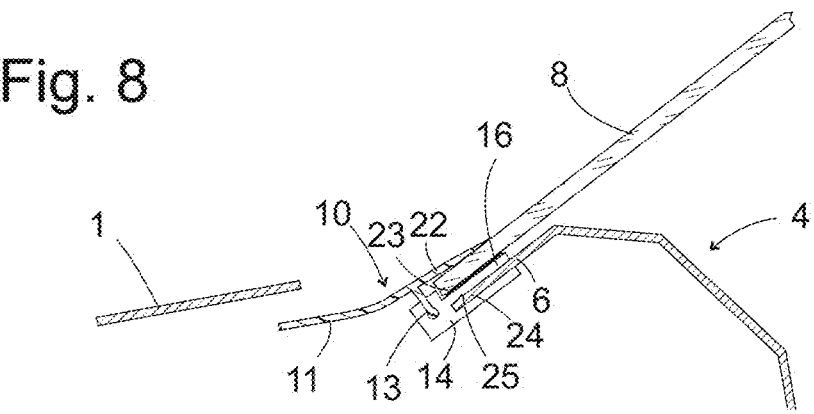

MOTOR VEHICLE WITH RADIATOR TANK ASSEMBLY

CROSS-REFERENCE TO RELATED APPLICATION

This application claims priority to German Patent Application No. 10 2012 006 533.7, filed Mar. 29, 2012, which is incorporated herein by reference in its entirety.

TECHNICAL FIELD

The technical field relates to a motor vehicle with a radiator tank assembly. A radiator tank in a motor vehicle is usually situated at a lower edge of its windshield, and used to accommodate various components, such as windshield wiper motors and linkages. A radiator tank cover is usually provided to keep water and dirt flowing from the windshield away from the radiator tank.

BACKGROUND

Known from DE 10 2007 017 427 A1 is a motor vehicle in which an edge of the radiator tank cover is designed as a U-profile, which grips the lower edge of the windshield by having a weather side leg of the U-profile abut against a weather side of the windshield, and an inner leg of the U-profile form a guide pad that extends on an interior side of the windshield.

Accordingly, it may be desirable to optimize this structural design with an eye toward protecting pedestrians. In addition, other objects, desirable features and characteristics will become apparent from the subsequent summary and detailed description, and the appended claims, taken in conjunction with the accompanying drawings and this background.

SUMMARY

In a motor vehicle with a windshield and a radiator tank assembly that acts on the lower edge of the windshield and exhibits a guide pad extending on an interior side of the windshield, this object is achieved according to the present disclosure by dividing the guide pad into a central and two lateral sections, and more rigidly supporting the windshield on the central section than on the lateral sections.

It was discovered in tests leading to the present disclosure that the U-profile that conventionally acts on the lower edge of the windshield prevents the windshield from bursting when it collides with an impactor, and also stops the windshield and the pane bracket that supports its lower edge from subsequently buckling, and that the closer the point of impact of the impactor is to the lateral edges of the windshield, the HIC (head injury criterion) values may be higher. In order to diminish the stiffening of the windshield attributable to the radiator tank assembly in these critical lateral areas, it proves beneficial to have the guide pads be more flexible in these areas than in the middle.

Such a location-dependent variable support can be achieved in particular by having the outer sections of the guide pad be more flexible than the central section during exposure to a pressure acting on the windshield from outside.

In extreme cases, the guide pad can be spaced apart from the windshield in the lateral areas, so as to only support the windshield in the middle, and avoid any windshield-supporting action whatsoever in the lateral areas. In such an instance, the effect of the lateral areas of the guide pad can be limited to keeping rainwater streaming up the outside of the windshield out of the passenger cabin.

An elevated flexibility of the lateral sections is easy and cost-effective to realize in particular when the central section and outer sections comprise part of at least two different components.

For example, in particular the central section can be a constituent of an extrusion profile, the cross section and stiffness of which are generally constant over its entire length.

A higher flexibility for the outer sections can be achieved not just in this case, but also if the sections are realized in the same component by having the central section be adhesively bonded to the windshield, while the outer sections are not adhesively bonded. As a result, the central section of the guide pad and windshield can stiffen each other, but not the outer sections.

The central section can form an inner leg of a U-profile that grips a lower edge of the windshield, thereby stabilizing it. By contrast, such a U-profile should be absent on the outer sections.

An exemplary embodiment completely lacking such a stiffening U-profile can be provided, i.e., a structural design in which the radiator tank assembly does not even come into contact with an exterior side of the windshield at all, in particular not in the central section.

In addition, the outer sections can be made out of a more flexible material than the central section.

In one exemplary embodiment, if the radiator tank assembly encompasses a radiator tank cover and a connecting profile that joins the latter with the windshield (which can in particular be the aforementioned extrusion profile), the central section of the guide pad is generally part of the connecting profile, while the lateral sections are part of the radiator tank cover.

The radiator tank cover can be formed out of flat material, in particular by thermoforming plastic or sheet steel. It can also be entirely or partially injection molded.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 3 is a perspective view of the radiator tank cover from FIG. 2;

FIG. 4 is a schematic section through the body parts depicted on FIGS. 1 and 2 along a sectional plane running through the middle of the vehicle according to an exemplary embodiment of the present disclosure;

FIG. 5 is a section analogous to FIG. 4 along a laterally displaced sectional plane;

FIG. 6 is the radiator tank cover from FIG. 3 with a connecting profile secured thereto according to an exemplary embodiment of the present disclosure;

FIG. 7 is a section through the radiator tank cover on FIG. 6 and adjacent parts of the vehicle along a sectional plane running through the middle of the vehicle; and FIG. 8 is a section analogous to FIG. 7 according to an exemplary embodiment of the present disclosure.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
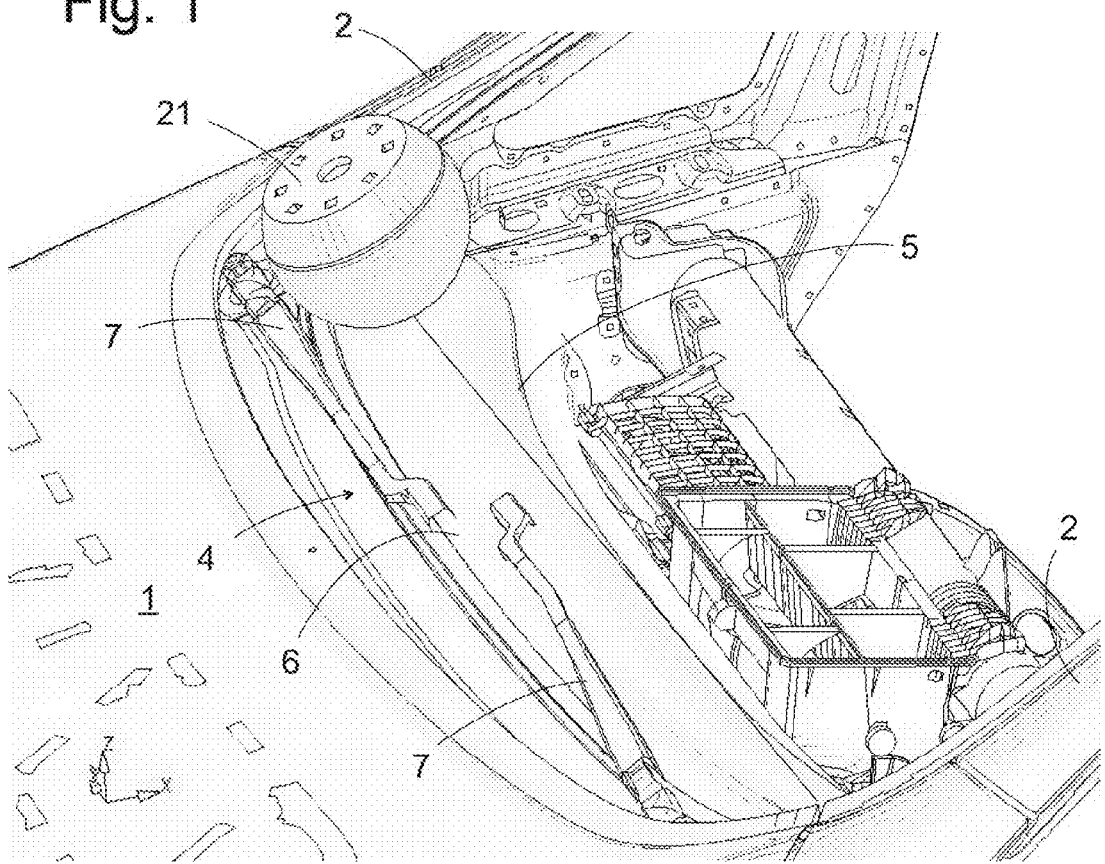
FIG. 1 is a perspective view depicting part of the body of a motor vehicle according to the present disclosure and an impactor that simulates the impact between a pedestrian's head and the body.

FIG. 1 shows a perspective view depicting part of a motor vehicle body in which the present disclosure can be applied. Evident is the rear area of a front opening hood 1 as well as an adjoining window opening that holds a windshield in a finished motor vehicle, flanked by A pillars 2. A dashboard paneling extending under the windshield in the finished vehicle has been omitted on FIG. 1, revealing a pane bracket 4 that in a finished vehicle is concealed under the dashboard paneling. The pane bracket 4 is thermoformed out of sheet steel in the form of a channel with a downwardly facing, concave side, wherein a front, lateral wall of the channel that steeply slopes toward the front forms a supporting flange 6 for the windshield. A rear flange 5 of the pane bracket 4 facing the passenger cabin abuts against a bulkhead (not visible on FIG. 1) extending between the engine compartment and passenger cabin of the motor vehicle.

A radiator tank (not visible on FIG. 1) that accommodates the motors of windshield wipers 7 extends under the supporting flange 6 and rear edge of the windshield in a manner known in the art.

An impactor 21 depicted over the window opening demonstrates how, during a collision between the vehicle and a pedestrian, the head of the latter typically would impact the lower area of the windshield or at the height of the radiator tank adjacent to the lower edge of the window opening.

Figure 2:
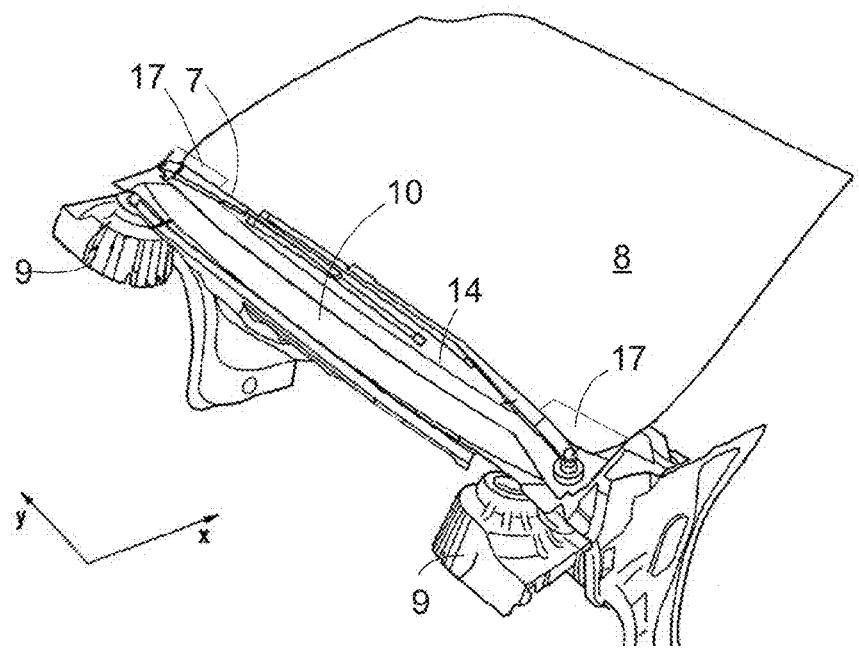
FIG. 2 illustrates remaining parts from a similar perspective to complete the body on FIG. 1.

In a perspective view similar to the one on FIG. 1, FIG. 2 shows the windshield to be mounted in the window opening, here marked 8. On FIG. 2, a free space provided to accommodate the radiator tank extends over the entire width of the windshield 8 between a lower edge of the windshield 8 and strut towers 9 for the front wheels of the motor vehicle. A radiator tank cover 10 extends over the entire width of the windshield 8, from its lower edge up until under the front opening hood 1 (not shown on FIG. 1). The radiator tank cover 10 is thermoformed or injection molded out of a flat material, in particular a sheet steel or plastic plate. The details thereof may be most clearly discerned from FIG. 3. A flank 11 of the radiator tank cover 10 that slopes downwardly toward the front adjoins the lower edge of the windshield 8, and substantially extends the latter flush with the engine compartment. The downwardly sloping flank 11 is adjoined by a flank 12 that slopes upwardly toward the front, which together with the downwardly sloping flank 11 forms a channel in which water running off the windshield 8 can flow off to the sides.

FIG. 4 shows a schematic view along the longitudinal central plane of the vehicle through parts of the windshield 8, front opening hood 1 and radiator tank cover 10. In one exemplary embodiment of the present disclosure, a connecting profile 14 extruded out of plastic encompasses a weather-side leg 15 and an inner leg 16, which border a groove in which the lower edge of the windshield 8 is clamped and adhesively bonded. A second groove of the connecting profile 14 accommodates, generally in a positive manner, a web 13 that is downwardly angled away from a rear edge of the flank 11 of the radiator tank cover. Depicted in only a roughly schematic fashion, the radiator tank is marked 19, and the front wall supporting the pane bracket 4 is marked 20.

The connecting profile 14 does not extend over the entire width of the windshield 8, but rather over a central section of its lower edge. Lateral sections approx. 30 cm in width extend on either side of the central section up until the A-pillars 2, and do not exhibit the connecting profile 14.

As depicted on FIG. 5, the web 13 in these lateral sections expands until under the lower edge of the windshield, and carries a lug 17, which lengthens the inner leg 16 of the connecting profile 14, extending upward and abutting against the interior side of the windshield 8. The inner leg 16 and lugs 17 can together be viewed as a guide pad 20, which supports the windshield 8 over its entire width, but less effectively in the lateral sections than in the central section. As opposed to the legs 15, 16 of the connecting profile that grip the inside and outside of the windshield 8, the lug 17 has no stiffening effect of note on the windshield 8, in particular because, among other things, it is not adhesively bonded with the pane or sheet metal, and substantially serves only to prevent moisture from getting inside the vehicle between the lower edge of the windshield 8 and radiator tank cover 10. Just as the channel formed by the flanks 11, 12, a channel 18 formed by the web 13 and lug 17 slopes laterally downward to allow the rainwater to run off The radiator tank cover 10 can be injection molded as a single piece out of plastic; if it is composed partially of sheet steel, the plastic lugs 17 can be injection molded to the portion fabricated out of sheet steel.

An exemplary embodiment of the present disclosure is depicted on FIGS. 6 and 7 based on a perspective view of the radiator tank cover 10 and the connecting profile 14 joined thereto, and on FIG. 7 based on a section analogous to FIG. 4. The radiator tank cover 10 in this embodiment is identical to the one in the exemplary embodiments of FIGS. 3 and 5. The reinforcing profile 14 substantially differs from the one in the prior exemplary embodiment by the absence of the weather-side leg 15 abutting against the exterior side of the windshield 8. As evident from FIG. 6, the inner leg 16 and the lugs 17 of the radiator tank cover 10 form a nearly continuous guide pad, which supports the windshield along its entire lower edge. The rear edge of the windshield 8 is not cased at the reinforcing profile 14 of this exemplary embodiment, but rather only rigidly adhesively bonded on the inner leg 16. The absence of the weather-side leg does not significantly influence the resilience of the reinforcing profile 14; any resultant losses in stiffness arising can be offset by modifying the cross section of the profile 14 at another location. Important within the framework of the present disclosure is that, if the windshield 8 becomes splintered upon collision with the impactor 21, the windshield fragments are not kept from moving against each other by inclusion between the two legs of a U-profile. In other words, while the resilience of the windshield 8 in an intact state need not be lower than in the first configuration with the cross section of the connecting profile 14 suitably dimensioned, the flexibility after the impact and the resulting destruction of the windshield 8 is improved, so that an impacting head can be intercepted and decelerated with a low average delay.

The lugs 17 only abut against the interior side of the windshield 8, without being adhesively bonded thereto. Given a deformation during exposure to a load, the windshield 8 and lugs 17 can thus shift relative to each other in a surface parallel manner, making it easier to yield under a load.

In a section analogous to FIG. 7, FIG. 8 shows another exemplary embodiment of the present disclosure. The radiator tank cover 10 is here—whether in its entirety or at least in its portion visible on the figure—made out of a moderately flexible, rubbery-elastic material, and is elongated toward the rear beyond the web 13 latched into the connecting profile by a thin-walled, flexible lip 22, which tightly abuts against the exterior side of the windshield 8, and keeps rainwater running off the windshield 8 away from the connecting profile 14.

As in the previous exemplary embodiment, the connecting profile 14 encompasses a wide inner leg 16 that is fixed to the interior side of the windshield 8 by means of an adhesive film 23. The leg 16 is in turn divided into two parts by a slit 24 running in a longitudinal direction. The front flange 6 of the pane bracket 4 engages in the slit 24. The front flange 6 can exhibit latching projections 25, which engage in complementary recesses of the connecting profile 14, and thereby provide a stabilizing, non-positive connection between the radiator tank cover and pane bracket 4.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A motor vehicle, comprising:
   a windshield; and
   a radiator tank assembly that acts on the lower edge of the windshield and exhibits a guide pad extending on an interior side of the windshield,
   wherein the guide pad is divided into a central and two lateral sections, and the windshield is more rigidly supported on the central section than on the lateral sections; and
   wherein the lateral sections are more flexible than the central section during exposure to a pressure acting on the windshield from outside.

2. The motor vehicle according to claim 1, wherein the central section and the lateral sections comprise part of at least two different components.

3. The motor vehicle according to claim 2, wherein the central section is a constituent of an extrusion profile.

4. The motor vehicle according to claim 1, wherein the central section is adhesively bonded to the windshield, and the lateral sections are not adhesively bonded to the windshield.

5. The motor vehicle according to claim 1, wherein the central section forms an inner leg of a U-profile that grips a lower edge of the windshield.

6. The motor vehicle according to claim 1, wherein the radiator tank assembly does not come into contact with an exterior side of the windshield.

7. The motor vehicle according to claim 1, wherein the radiator tank assembly encompasses a fixed lip that abuts against an exterior side of the windshield.

8. The motor vehicle according to claim 1, wherein the lateral sections are made out of a more flexible material than the central section.

9. The motor vehicle according to claim 1, wherein the radiator tank assembly exhibits a radiator tank cover and a connecting profile secured to the radiator tank cover, the central section of the guide pad is part of the connecting profile, and the lateral sections are parts of the radiator tank cover.

10. The motor vehicle according to claim 9, wherein the radiator tank cover is formed or injection molded out of flat material.

11. A motor vehicle, comprising:
    a windshield; and
    a radiator tank assembly including a fixed lip that abuts against an exterior side of the windshield and a guide pad extending on an interior side of the windshield,
    wherein the guide pad is divided into a central and two lateral sections, and the windshield is more rigidly supported on the central section than on the lateral sections; and
    wherein the lateral sections are more flexible than the central section during exposure to a pressure acting on the windshield from outside.

12. The motor vehicle according to claim 11, wherein the central section and the lateral sections comprise part of at least two different components.

13. The motor vehicle according to claim 12, wherein the central section is a constituent of an extrusion profile.

14. The motor vehicle according to claim 11, wherein the central section is adhesively bonded to the windshield, and the lateral sections are not adhesively bonded to the windshield.

15. The motor vehicle according to claim 11, wherein the central section forms an inner leg of a U-profile that grips a lower edge of the windshield.

16. The motor vehicle according to claim 11, wherein the lateral sections are made out of a more flexible material than the central section.

17. The motor vehicle according to claim 11, wherein the radiator tank assembly exhibits a radiator tank cover and a connecting profile secured to the radiator tank cover, the central section of the guide pad is part of the connecting profile, and the lateral sections are parts of the radiator tank cover.

18. The motor vehicle according to claim 17, wherein the radiator tank cover is formed or injection molded out of flat material.

* * * * *